2,820,834

DEHYDROGENATION OF HYDROCARBONS IN THE PRESENCE OF A SAMARIUM SESQUIOXIDE CATALYST

Vasili I. Komarewsky, Chicago, Ill., assignor, by mesne assignments, to Heavy Minerals Co., Chicago, Ill., a corporation of Delaware No Drawing. Application June 14, 1955
Serial No. 515,549

16 Claims. (Cl. 260—683.3)

This invention relates as indicated to the dehydrogenation of hydrocarbons and more particularly to dehydrogenation employing samarium oxide as a catalyst.

In the past the paraffin and cycloparaffin hydrocarbons have been dehydrogenated employing as catalysts the compounds of chromium, molybdenum, and vanadium. The cycloparaffins have been dehydrogenated using compounds of nickel, platinum, chromium, molybdenum, vanadium. Heretofore, there have been no known compounds for selectively catalytically dehydrogenating the paraffins and in the presence of cycloparaffins.

It is, therefore, an object of the invention to provide means for dehydrogenating aliphatic hydrocarbons.

It is another object of the invention to selectively dehydrogenate aliphatic hydrocarbons in the presence of cyclic hydrocarbons.

It is a further object of the invention to provide a process for separating the acyclic and cyclic paraffins.

Other objects and advantages of the invention will be apparent as the description proceeds.

To the foregoing and related ends said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention relates to a process for the dehydrogenation of aliphatic hydrocarbons employing a catalyst consisting of at least 98% by weight samarium sesquioxide.

More particularly, this invention relates to the process for dehydrogenation which comprises subjecting aliphatic hydrocarbons to the action of a catalyst consisting of at least 98% by weight of samarium oxide ($Sm_2O_3$) at a temperature within a range from about 430° C. to 650° C. at a space velocity of not more than about 2.0.

The hydrocarbons which may be dehydrogenated in the process of the invention include both the gaseous and liquid compounds and may be either the alkenes or alkanes. Ordinarily, the aliphatic hydrocarbons which contain from 2 to 12 carbon atoms are used in the process, however, those containing from 7 to 9 carbon atoms are preferred.

The catalyst employed in the dehydrogenation reaction is samarium oxide ($Sm_2O_3$). It is prepared by precipitation of the hydroxide from a solution of samarium chloride, washing with water, and drying at elevated temperatures for example within the range of about 100° C. to 650° C. in atmosphere of inert gas. It has been found that the catalyst must be employed in pure form, such as at least 98% by weight.

In carrying out the dehydrogenation of hydrocarbons according to the present invention, the catalyst, as prepared above, is used as a filler in a reaction tube or chamber, in the form of pellets or particles of graded size (8 to 10 mesh) and the hydrocarbon gas or vapor to be dehydrogenated is passed through a stationary mass of the catalyst particles after being heated to the proper temperature, usually, at atmospheric pressures, within the range from about 430° C. to 650° C., depending upon the hydrocarbon or mixtures of hydrocarbons undergoing treatment. The most commonly used temperatures, at atmospheric pressures, however, are around 480° C. to 540° C. The catalyst tube is usually heated exteriorly to maintain the proper reaction temperature. The pressure employed may be subatmospheric, atmospheric, or slightly superatmospheric. The superatmospheric pressures may be in the order of from 50 pounds to 100 pounds per square inch. While superatmospheric pressures may be employed, atmospheric pressures are generally preferred.

The space velocity needed for the desirable reaction is generally within the range from about 0.1 to 2.0, and usually not more than 2.0. By space velocity is meant that unit volume of the liquid is vaporized and passed through unit volume of catalyst for unit of time. A space velocity of one is equal to passing 100 ml. of liquid in vapor form through 100 ml. of catalyst for one hour.

When the activity of the catalyst begins to diminish it is readily regenerated by the simple expedient of oxidizing with air or other oxidizing gas at a moderately elevated temperature, usually within the range employed in the dehydrogenation reactions. This oxidation effectively removes traces of carbon deposits which contaminate the surface of the particles and decrease their efficiency. It is characteristic of the present types of catalysts that they may be repeatedly regenerated without substantial loss of catalytic potency.

In order to more clearly illustrate our invention, and the preferred modes of carrying the same into effect, the following examples are given.

Example 1

Samarium oxide ($SM_2O_3$) was prepared by precipitation of samarium hydroxide from a samarium chloride solution by treatment with sodium hydroxide; the precipitate was washed with water ion free and dried at 105° C. The so-dried cake was broken to 8 to 10 mesh particles and placed in the catalytic tube. The catalysts were activated by gradually heating to 499° C. in a stream of hydrogen or nitrogen. No carrier was employed. The so-prepared catalyst contained at least 98% by weight of samarium oxide.

Example 2

Heptane was vaporized and passed through a chamber containing the catalyst prepared in Example 1 at 500° C. at a space velocity of 0.2. The composition of the exit products included 10% by weight of olefins and 17% by weight of aromatics.

Example 3

Heptene vaporized and passed through a catalyst prepared in Example 1 at 500° C. at a space velocity of 0.2 yields a composition having approximately 19% by weight of aromatics.

Example 4

Cyclohexane was vaporized and passed through a chamber containing the catalyst prepared in Example 1, at a temperature of 500° C. and a space velocity of 0.2. The compound was unchanged by contact with the catalyst.

The selective dehydrogenation of the aliphatic hydrocarbons in the presence of saturated cyclic hydrocarbons affords a novel method for the separation of saturated acyclic and cyclic hydrocarbons. A mixture of the acyclic and cyclic compounds is passed through a catalyst, prepared as in Example 1 above, so that the acyclic hydrocarbon is dehydrogenated while the saturated cyclic hydrocarbon is unchanged. By contact with the catalyst the acyclic hydrocarbon forms olefins and aromatics which may be readily separated from the saturated cyclic hydrocarbons by any of the known methods, for example by treatment with a sulfuric acid, sulfur dioxide, or absorption with silica gel.

Other modes of applying the principle of the invention may be employed, change being made as regards the details described, provided the features stated in any of the following claims or the equivalent of such be employed.

I, therefore, particularly point out and distinctly claim as my invention:

1. A process for dehydrogenation which comprises subjecting aliphatic hydrocarbons to the action of a catalyst of samarium sesquioxide at a temperature within the range from about 430° C. to 650° C. at a space velocity of not more than about 2.0.

2. The process of claim 1 wherein said aliphatic hydrocarbons contain from 2 to 9 carbon atoms.

3. The process of claim 1 wherein said aliphatic hydrocarbons are alkanes.

4. A process for dehydrogenation which comprises subjecting alkenes to the action of a catalyst of samarium sesquioxide at a temperature within the range from about 430° C. to 650° C. at a space velocity of not more than about 2.0.

5. The process of claim 1 wherein said aliphatic hydrocarbons are alkanes containing from 2 to 9 carbon atoms.

6. A process for dehydrogenation which comprises subjecting alkenes containing from 2 to 9 carbon atoms to the action of a catalyst of samarium sesquioxide at a temperature within the range from about 430° C. to 650° C. at a space velocity of not more than about 2.0.

7. The process of claim 1 wherein said aliphatic hydrocarbons are normally liquid compounds.

8. A process for the selective dehydrogenation of hydrocarbons which comprises subjecting a mixture of aliphatic and cyclic hydrocarbons to the action of a catalyst of samarium sesquioxide at a temperature within the range from about 430° C. to 650° C. at a space velocity not more than about 2.0 whereby the aliphatic hydrocarbons are selectively dehydrogenated to the exclusion of the cyclic hydrocarbons.

9. The process of claim 8 wherein said aliphatic hydrocarbons contain from 2 to 9 carbon atoms.

10. The process of claim 8 wherein said aliphatic hydrocarbons are alkanes.

11. The process of claim 8 wherein said aliphatic hydrocarbons are alkenes.

12. The process of claim 8 wherein said aliphatic hydrocarbons are alkanes containing from 2 to 9 carbon atoms.

13. The process of claim 8 wherein said aliphatic hydrocarbons are alkenes containing from 2 to 9 carbon atoms.

14. The process of claim 8 wherein said aliphatic hydrocarbons are normally liquid compounds.

15. A process for separating saturated aliphatic hydrocarbons from saturated cyclic hydrocarbons which comprises subjecting the mixture of aliphatic and cyclic hydrocarbons to a catalyst consisting of at least 98% by weight of samarium sesquioxide, whereby the aliphatic hydrocarbons are selectively dehydrogenated to unsaturated and aromatic compounds and then separating the unsaturated and aromatic compounds from said saturated cyclic hydrocarbons.

16. A process for dehydrogenation which comprises subjecting alkanes to the action of a catalyst consisting essentially of at least 98% by weight of samarium sesquioxide at a temperature within the range from about 430° C. to 650° C. at a space velocity of not more than about 2.0.

References Cited in the file of this patent

UNITED STATES PATENTS

| | | |
|---|---|---|
| 1,871,117 | Day | Aug. 9, 1932 |
| 2,148,129 | Morrell et al. | Feb. 21, 1939 |

OTHER REFERENCES

Hopkins et al.: Trans. of the Electrochemical Society, vol. 71 (1937), pages 397–403. (Pages 402 and 403 only relied on.)